Patented July 10, 1945

2,379,914

UNITED STATES PATENT OFFICE 2,379,914

RECOVERY OF RARE SUGARS

Louis Laufer and Jesse Charney, New York, N. Y., assignors to Schwarz Laboratories, Inc., New York, N. Y., a corporation of New York No Drawing. Application August 14, 1942,
Serial No. 454,838

29 Claims. (Cl. 260—209)

Our present invention is directed to an improvement upon that of our prior application, Serial No. 454,022, filed August 7, 1942, which is concerned with the extraction of d-ribose and kindred sugars from biologic substances that bear purine nucleotides or nucleosides.

An object of the present invention is to recover by a relatively simple process a high yield of d-ribose directly from nucleic acid bearing substances, though the nucleic acid be recovered by the use of iron chloride and have substantial amounts of ferric or other impurities therein, the present invention serving to eliminate on the one hand the need for first freeing of ferric or other reagent the nucleic acid that serves as the source of sugar, and on the other, the need for large quantities of costly precipitating reagents and for elaborate processing.

The presence of iron in the nucleic acid used as the starting material for the recovery of d-ribose or other pentose would lead to loss by oxidation of much of the sugar in the course of releasing nucleosides by prolonged alkaline treatment under pressure and heat resorted to in the process of said prior application.

While iron-free nucleic acid useful as a source of d-ribose may be derived from pressed yeast or other source of nucleic acid by extraction followed by precipitation with alcohol according to familiar practice, such procedure is costly in materials. While the high cost of materials is avoided by the use of iron chloride to precipitate crude nucleic acid from the biologic material bearing the same, according to a recently developed process, considerable expense is involved in processing such nucleic acid for removal of all iron therefrom with a view to obviating the loss of sugars by oxidation as above pointed out.

According to the invention, the prolonged alkaline treatment of the nucleic acid under pressure and heat is dispensed with, and the pentose is split off from the nucleotides without first converting them to nucleosides. This is accomplished by acid hydrolysis after a short alkali treatment at atmospheric pressure and relatively lower temperature; by which acid hydrolysis not only the pentose, but the phosphoric acid as well are split off from the nucleotides. A high yield of the rare sugar is garnered in carrying out this procedure, even though crude nucleic acid with ferric reagent remaining therein be used as the starting material.

The treatment set forth has its preferred application to the extraction of d-ribose from substances containing ribonucleotides that includes some or all of xanthylic, inosinic, guanylic and adenylic acids.

According to the invention, nucleic acid may be freed in crude form from yeast cells or other biologic source and then broken up into its constituent nucleotides, or alternatively the nucleic acid or other nucleotide bearing substance may be freed from the yeast cells or the like, and concurrently be broken up into such constituent nucleotides, from which nucleotides the rare sugar is split off in manner also taught by the present invention. Each of the alternative procedures involves a series of steps which includes a mild hydrolysis, and these will now be set forth in greater detail. By mild hydrolysis is meant treatment with dilute reagents at or below boiling point at atmospheric pressure.

According to the first of said alternative procedures for recovering nucleotides, crude nucleic acid is first prepared as follows: The processed yeast or other source of purine nucleotides after treatment with alkali to free the nucleic acid from the cells is treated with mineral acid to bring the pH to a value close to the isoelectric point of much of the protein matter. Upon boiling, such protein is precipitated and then filtered out, while the nucleic acid content remains in solution. The filtrate is now adjusted by the addition of hydrochloric acid to pH 4.5 and then boiled again, which results in the precipitation of more of the protein matter. After filtering, the pH of the filtrate is further adjusted by the addition of more hydrochloric acid, to a pH between 1.5 and 4.5, desirably to about 2.5. Approximately 1 per cent by weight of iron chloride, preferably ferric chloride, is then added, yielding the desired precipitate of crude nucleic acid, which after washing, serves as the source of the d-ribose.

By the steps set forth for producing the crude nucleic acid, not only is much of the protein matter removed, but the final adjustment of the pH precludes the precipitation of many of the remaining impurities, when the ferric chloride is subsequently added. For that reason the precipitate has a content of as high as 70 to 85 per cent of pure nucleic acid and the impurities are such as not to interfere with the separation of a rich yield of pentose therefrom by the steps to be set forth hereinafter.

The nucleic acid, regardless whether it be in crude or contaminated form as above described, or whether it be previously refined, is subjected to mild alkaline hydrolysis. For this purpose, the crude or refined nucleic acid is preferably boiled in caustic soda, desirably 5 per cent sodium hydroxide for a period of 30 to 45 minutes, and the precipitated gums, iron hydroxide and impurities are filtered off. By that treatment the acid is broken down into its constituent nucleotides, for instance, the purine nucleotides, adenylic and guanylic acids, and the pyrimidine nucleotides, cytidylic and uridylic acids.

According to the second of the alternative procedures above referred to, the yeast or other source of nucleotides is boiled for about one hour with alkali such as sodium hydroxide in a 3 to 10 per cent, preferably a 5 per cent aqueous solution, in conjunction with calcium compound such as lime or equivalent alkali earth compound. The resultant precipitated impurities which include phosphates extraneous of the nucleotides, are now filtered out with the other yeast solids, leaving a filtrate that contains in solution the free nucleotides of the hydrolyzed nucleic acid, such as those above mentioned, that are contained in the yeast or the like.

Whether the nucleic acid is broken down into its constituent nucleotides only after it has been released from the yeast cells by the first of the foregoing procedures, or is thus released and broken down concurrently in a single step, such nucleotides remain intact in solution. They do not break down into the nucleosides and the impurities that remain in solution therewith are such as not to interfere with the separation of a rich yield of pentose therefrom by the steps to be set forth hereinafter.

The nucleotide solution yielded by either of the foregoing procedures, is desirably treated with acid preferably dilute sulphuric acid until the pH of the solution is approximately 7.0 to 9.0. The filtrate after being thus substantially neutralized is then treated with copper cation and desirably oxide of sulphur anion, of which only one is in the reducing form, to provide cuprous ions for yielding a precipitate of cuprous nucleotides, such as cuprous adenylic acid and cuprous guanylic acid which are new chemical compounds, and are claimed as such. The pyrimidine nucleotides remain largely in solution.

The precipitate is thereupon subjected to hydrolysis with sulphuric acid, which results in splitting off both the glycosidic and the phosphoric ester linkage of the nucleotides, leaving in suspension insoluble cuprous purines such as copper adenine and copper guanine, and bringing into solution free pentose and free phosphoric acid. The impurities are removed from the filtrate by precipitation with alkaline earth hydroxide, leaving substantially pure d-ribose in solution.

The treatment of the nucleotides with cuprous ion resembles that specified for treatment of the nucleosides in the earlier application. As is the case with said nucleosides, those purine nucleotides which form insoluble salts or that have an unsubstituted No. 7 position in the purine group are more or less selectively precipitated, the other nucleotides remaining in solution.

Preferred controls for recovering the d-ribose from the purine nucleotides in solution, regardless by which of the alternative processes such solution is prepared will now be set forth:

The filtrate is first treated to form insoluble copper salts of the purine nucleotides. This is accomplished by first neutralizing the filtrate, desirably with sulphuric acid and then adding copper sulphate and sodium acid sulphite until a final pH of between 2.0 and 8.5, but preferably between 3.0 to 6.5 is reached, or, alternatively to the latter step by adding cuprous oxide and sulphuric acid until the final pH of the solution is from 2 to 3.5.

The salts are filtered out and washed with plain water, either hot or cold. The safeguard of using sulphite solution for the wash is unnecessary, as the nucleotides do not tend to oxidize as readily as the nucleosides. In this operation, the great bulk of the pyrimidines will remain in the filtrate.

The copper salt is now suspended in sulphuric acid solution of 0.5 to 2.0 normal strength and hydrolyzed at boiling temperature for a substantial period of two to four hours, which results in splitting off from the nucleotides the phosphoric acid and the pentose. The insoluble cuprous purine salts, comprising copper adenine and copper guanine are now filtered off.

The pH of the filtrate is adjusted to pH 6.5 to 8.5 by the addition of oxides or hydroxides of alkaline earth metals, desirably barium hydroxide or lime, which precipitates barium or calcium phosphate and sulphate, cuprous and cupric hydroxide, and organic impurities. The d-ribose remains in the filtrate together with small amounts of impurities.

In a preferred process for concentrating and purifying the pentose separated as above briefly set forth, the same, after concentration is absorbed upon a suitable inert material of large surface capacity such as purified diatomaceous earth with which a quantity of activated carbon is admixed. The mass is subsequently dried at reduced pressure and extracted by means of a soxhlet or similar apparatus with suitable solvent, such as 3.5 to 5 parts by volume of ethyl ether and one part of 95 per cent ethyl alcohol that selectively removes only the pentose and leaves the impurities as a residue in the inert mass. Upon evaporation of the solvent and seeding, the pure pentose is obtained in crystallized form.

Specifications in considerable detail for deriving refined d-ribose from nucleic acid according to the invention will now be set forth, to assure technical compliance with the strictest interpretation of the statutory requirements.

50 grams of nucleic acid which may be derived from the pressed yeast or other source thereof by the procedure above described and which may be approximately 85 per cent pure is introduced in 200 c. c. of a 5 per cent sodium hydroxide solution and heated on a boiling water bath for 30 to 45 minutes. The insoluble residue of gums and other impurities formed by the end of this period is filtered off, washed thoroughly in a 5 per cent solution of caustic and the washings are combined with the filtrate.

The filtrate which may be about 300 c. c. is diluted with water to about 1000 c. c. and neutralized, preferably with sulphuric acid to a pH of about 8.5. To this solution is added 310 c. c. of a solution made of 250 c. c. of copper sulphate solution (25 grams $CuSO_4.5H_2O$ in 100 c. c. of water) and 60 c. c. of sodium acid sulphite solution (210 grams $NaHSO_3$ in 750 c. c. of water). This reduces the pH to about 4.0. This step is desirably carried out at between 25 degrees and 100 degrees C. An immediate precipitation occurs which is essentially of cuprous salts of adenylic and guanylic acids. The precipitate is separated out by a centrifuge and then washed by centrifugal decantation. Four such water washings, each with about 750 c. c. of water are sufficient. The liquid contains most of the pyrimidine nucleotides. The washed precipitate consists of the cuprous salts of all of the purine nucleotides and some pyrimidine nucleotide.

The washed cuprous nucleotides are dissolved in 1000 c. c. of normal sulphuric acid and refluxed for two hours, which results in splitting the nucleotides into cuprous purines, phosphoric acid and d-ribose. The cuprous purines precipitate out, while the d-ribose, phosphoric acid and in addition the excess of sulphuric acid, some copper and some organic impurities remain in solution. The reaction products are filtered hot on a Buchner funnel, and washed with water to a total filtrate volume of 1100 to 1200 c. c., leaving relatively pure cuprous adenine and cuprous guanine salts as the residue.

To the cooled filtrate is added a slurry of $Ba(OH)_2$ until the pH of the mixture is about 7. Substantially all of the sulphates, phosphates, copper and organic impurities are thereby precipitated, leaving in solution the d-ribose with but small amounts of impurities. The slurry is filtered and washed with about two liters of water.

The filtrate of about 3500 c. c. is now concentrated under reduced pressure to a syrup of 10 to 15 c. c. which is thereupon diluted with water to 30 c. c. and filtered through a gooch crucible with washing to a total filtered volume of 125 c. c. This filtrate is treated with two grams of carbon at about 70 degrees C. for 15 minutes, filtered and washed to a volume of 200 c. c. after which it is concentrated at reduced pressure to 25 to 30 c. c., a syrup containing about 50 per cent solids.

The 25 to 30 c. c. of relatively pure d-ribose solution thus prepared is poured on 30 grams of purified diatomaceous earth, one commercial form of which that is particularly suitable, being identified as "Celite 503" to which is added 5 to 10 per cent of activated carbon. The mass is dried at 40 degrees C. in a vacuum desiccator. The dried material is thereupon extracted for four hours in a soxhlet apparatus with a solvent consisting approximately four parts of ethyl ether by volume and one part of 95 per cent ethyl alcohol by volume. The extracted sugar crystallizes out when the solvent is evaporated off and the resultant syrup seeded. The yield is about 8 grams of d-ribose with a melting point of 85 to 87 degrees C.

While the most economical, and industrially the most advantageous procedure is to derive the sugar directly from substances bearing nucleotides or from crude nucleic acid as above set forth it will be understood that the process in certain of its aspects may, within the scope of the invention, be performed with refined nucleic acid as the starting material.

It will be understood that the procedure above set forth may be applied not only for the preparation of pure d-ribose but of other pentoses of the type found incorporated in the nine position in the purine group of nucleotides. Among such sugars are rhamnose, xylose, arabinose and desoxyribose. Among the types of nucleotides and substances bearing the same are not only nucleic acids, but such acids as thymo-nucleic acid, inosinic acid, xanthylic acid and like substances that may serve as the source of rare pentoses according to the present invention.

As many changes could be made in the above process and composition and many apparently widely different embodiments of this invention could be made without departing from the scope of the claims, it is intended that all matter contained in the above description shall be interpreted as illustrative and not in a limiting sense.

Having thus described our invention, what we claim as new and desire to secure by Letters Patent of the United States is:

1. The process which consists in subjecting solutions of nucleotide bearing substance to mild alkaline hydrolysis, then treating the same with a copper compound and an acid that conjointly afford cuprous ions with resultant precipitation of substantially insoluble cuprous salts of nucleotides and then separating and washing said precipitate.

2. The process which consists in treating solutions containing nucleotides with cuprous ions in an acid medium with the resultant selective separation in the form of a precipitate of those nucleotides which form insoluble cuprous salts.

3. The process which consists in subjecting nucleotide bearing substances to mild alkaline hydrolysis and then treating the same with cuprous ions in an acid medium with the resultant selective separation in the form of a precipitate of those purine nucleotides present that have an unsubstituted No. 7 position in the purine group.

4. The process of splitting complex organic molecules in biologic cell tissue substantially to isolate the purine nucleotides thereof from the pyrimidine nucleotides thereof, by subjecting the complex to mild alkaline hydrolysis and then treating the solution with cuprous ion in the presence of an acid with the consequent precipitation of cuprous salts of the purine nucleotides while the pyrimidine elements remain largely in solution.

5. The process which consists in splitting complex organic molecules of biologic cells to separate the purine nucleotides from the pyrimidine nucleotides, by subjecting the complex to mild alkaline hydrolysis, filtering, then treating the filtrate with cuprous ions in an acid medium with the resultant selective separation in the form of a precipitate of the cuprous salts of those purine nucleotides that have an unsubstituted No. 7 position in the purine group, while the pyrimidines and derivatives thereof remain largely in solution.

6. The process of separating nucleotides with unsubstituted No. 7 position in the purine group from like nucleotides with substituted No. 7 position in the purine group which consists in treating solutions bearing said two types of nucleotides with cuprous oxide in an acid medium with the resultant selective separation in the form of a precipitate of insoluble cuprous salts of those nucleotides that have an unsubstituted No. 7 position in the purine group.

7. The process comprising the treatment of crude nucleotides with a copper compound and an acid which conjointly afford cuprous ions that combine with said nucleotides, isolating those of the cuprous salts thus formed which are insoluble and splitting both the sugar and the phosphoric acid therefrom by acid hydrolysis.

8. The process comprising the treatment of crude purine nucleotides with a copper compound and an acid which conjointly afford cuprous ions that selectively combine chemically with purine nucleotides that have an unsubstituted No. 7 position in the purine group, isolating the cuprous salts thus formed which are insoluble and splitting both the sugars and the phosphoric acid therefrom by acid hydrolysis.

9. The process for preparing refined pentoses from crude purine nucleotides which consists in treating such nucleotides with cuprous ions to form insoluble cuprous salts of the said nucleotides, separating the precipitate of such salts, suspending the same in an acid medium at temperature near the boiling point and hydrolyzing the same, to separate out insoluble cuprous salts of purine, removing the same, and separating, refining and crystallizing the free pentose from the filtrate.

10. The process of preparing pentoses comprising the treatment of solutions bearing purine nucleotides at pH 2.0 to 8.5 with a copper compound and an acid which conjointly afford cuprous ions, thereby to isolate the insoluble cuprous salts of said nucleotides, washing said salts in water and recovering the sugars by hydrolysis in an acid medium.

11. The process of preparing d-ribose from substance containing ribonucleotides that include some or all of xanthylic, inosinic, guanylic and adenylic acids, which consists in treating solutions containing said ribonucleotides with cuprous salts and sulphuric acid at pH below 6.0 at 25 to 100 degrees C., followed by cooling, thereby to precipitate cuprous purine ribonucleotides, washing such salts to remove impurities and splitting off the d-ribose from such substantially pure salts.

12. The process of preparing rare sugars comprising the treatment of solutions of purine nucleotide bearing substances at pH 2.0 to 8.5 with copper cation and oxide of sulphur anion of which only one is in the reducing form, at 25 degrees to 100 degrees C., isolating the resultant precipitate of insoluble cuprous salts of nucleotides thus formed, washing the salts with water, hydrolyzing the said salts in dilute acid by boiling from two to four hours, removing the resultant precipitate of insoluble cuprous salt of purines and recovering the sugar from the filtrate.

13. The process of preparing sugars from solutions containing sugars combined with purines which consists in treating the sugar bearing substance with copper sulphate solution in conjunction with solutions affording sulphurous anions under conditions of acidity which render the pH of the treated solution between 3.0 and 6.5, thereby to isolate cuprous salts of purine nucleotides, washing said salts, hydrolyzing the same in approximately one normal sulphuric acid by boiling for two to four hours, removing therefrom the insoluble cuprous purines thus precipitated, adjusting the filtrate to pH 6.0 to 8.5 with a material selected from the group consisting of the oxides and hydroxides of the alkaline earth metals, removing the precipitate so formed and recovering substantially pure sugars from the filtrate.

14. The process of preparing sugars from solutions containing phosphoric sugar esters combined with purines which consists in adding cuprous salts and sulphuric acid thereto, thereby to precipitate insoluble cuprous purine nucleotides, washing such salts, hydrolyzing the substantially pure cuprous nucleotides thus obtained in one normal sulphuric acid at boiling temperature for two to four hours, followed by the removal of the insoluble cuprous purines therefrom, adjusting the filtrate to pH 6.0 to 8.5 with a material selected from the group consisting of the oxides and hydroxides of the alkaline earth metals, removing the precipitate so formed and recovering substantially pure sugars from the filtrates.

15. The process of preparing pentoses which consists in treating solutions of nucleotides derived by hydrolysis from nucleic acid, with copper sulphate solution in conjunction with sulphurous acid under conditions of acidity which yield a pH in the treated liquid of 3.0 to 6.5, thereby to precipitate the cuprous salts of adenylic and guanylic acid therefrom, washing such salts, hydrolyzing the washed salts by boiling from two to four hours in 0.5 to 2.0 normal sulphuric acid solution, removing insoluble cuprous salts of guanine and adenine therefrom, neutralizing the filtered hydrolyzate with a material selected from the group consisting of barium and calcium oxide and hydroxide of pH 6.5 to 8.5 to remove residual copper phosphate and sulphate and impurities, filtering, further purifying with activated carbon and recovering substantially the pure pentose from the filtrate.

16. The process of preparing d-ribose from purine ribonucleotides which consists of treating ribonucleotide solution with copper sulphate solution in the presence of sulphurous acid to yield a solution of pH 3.0 to 6.5, thereby to precipitate cuprous purine ribonucleotides, washing said salts to remove impurities, hydrolyzing the washed salts by boiling from two to four hours in approximately normal sulphuric acid solution, removing the insoluble cuprous purines thus formed, neutralizing the filtered hydrolyzate with a substance selected from the group consisting of barium and calcium oxide and hydroxide to pH 6.5 to 8.5 to remove residual copper sulphate, phosphate, sulphite and organic impurities, filtering, further purifying the filtrate with carbon and recovering substantially pure d-ribose from the filtrate.

17. The process of recovering pure crystalline d-ribose from substantially pure d-ribose solutions, which consists in decolorizing and concentrating the solution, absorbing the syrup thus formed in an inert material bearing 5 to 10 per cent of activated carbon, drying the mass, extracting the resulting dry material with selective d-ribose solvent of low boiling point and inert to the impurities present, evaporating the solvent extract, and seeding and crystallizing pure d-ribose from the syrup thus formed.

18. The process recited in claim 17 wherein purified diatomaceous earth serves as the inert material for absorption of the d-ribose syrup.

19. The process recited in claim 17 wherein the extracting solvent comprises about four parts by volume of ethyl ether and one part by volume of 95 per cent ethyl alcohol.

20. The process of deriving pentose from nucleotide bearing cells, which consists in freeing the nucleic acid from the cells and breaking the same down into its constituent nucleotides, and then performing the sequence of steps which consists of a mild hydrolysis of the nucleotides in solution at boiling temperature, precipitating from the filtrate the purine nucleotides in the form of cuprous salts thereof by the addition of cuprous ions in an acid medium, hydrolyzing the precipitate in sulphuric acid and thereby leaving a residue of cuprous salts of purines in a solution of pentose and phosphoric acid and adding alkaline earth hydroxide to the filtrate to precipitate out the phosphoric acid and other impurities, yielding a filtrate comprising substantially pure pentose solution.

21. The process set forth in claim 20 in which for the purpose of freeing the nucleic acid from the nucleotide bearing cells and breaking it down into its constituent nucleotides, the nucleic acid solution is adjusted in pH and boiled to precipitate much of the protein matter, the filtrate is then readjusted in pH to approximately 4.5 and boiled again and after filtering reduced in pH to between 1.5 and 4.5, and thereupon iron chloride is added, and in which the mild hydrolysis is in alkali solution.

22. The process recited in claim 20 in which the nucleotide bearing cells are treated with alkali in 3 to 10 per cent solution together with alkaline earth salts, for about one hour for the mild hydrolysis set forth.

23. The process of producing substantially pure d-ribose from nucleotide bearing biologic cells which consists in separating the nucleic acid from the cells by caustic treatment, filtering it, precipitating out protein matter under controlled pH, thereupon reducing the pH to about 2.5, adding 1 per cent of iron chloride, washing the precipitate thus obtained, subjecting the latter to mild alkaline hydrolysis, and after filtration thereof precipitating the purine nucleotides therefrom by the addition of cuprous compounds in the presence of acid and hydrolyzing the water-washed precipitate in dilute boiling sulphuric acid, thereby to precipitate the purines and to split off d-ribose and phosphoric acid and finally precipitating out the other impurities with alkaline earth hydroxide, yielding a solution of substantially pure d-ribose.

24. The combination recited in claim 23 in which the mild alkaline hydrolysis is conducted with 5 per cent sodium hydroxide boiled for 30 to 45 minutes.

25. The combination recited in claim 23 in which the precipitation with cuprous salts is conducted under final pH of 2 to 8.5.

26. The combination recited in claim 23 in which the acid hydrolysis of the copper salts is conducted in sulphuric acid in solution of 1 to 2 normal strength by boiling for two to four hours.

27. The combination recited in claim 23 in which the mild alkaline hydrolysis is conducted in 5 per cent sodium hydroxide by boiling therein for 30 to 45 minutes, the precipitation of cuprous salts is conducted at a pH of from 3 to 6.5 and the hydrolysis of the copper salts is conducted in sulphuric acid solution of one to two normal strength and boiled for two to four hours.

28. A composition consisting of a mixture of substantially pure cuprous salts of purine nucleotides that have an unsubstituted No. 7 position in the purine group.

29. A composition consisting of a mixture of substantially pure cuprous salts of guanylic and adenylic acid.

LOUIS LAUFER.
JESSE CHARNEY.